(12) United States Patent
Lee et al.

(10) Patent No.: US 10,935,863 B2
(45) Date of Patent: Mar. 2, 2021

(54) ELECTROCHROMIC DEVICE

(71) Applicant: LG CHEM, LTD., Seoul (KR)

(72) Inventors: Dong Hyun Lee, Daejeon (KR); Chang Yoon Lim, Daejeon (KR); Jae Sung Han, Daejeon (KR); Su Hee Lee, Daejeon (KR); Doo Hoon Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 122 days.

(21) Appl. No.: 16/303,329

(22) PCT Filed: Jun. 12, 2017

(86) PCT No.: PCT/KR2017/006058
§ 371 (c)(1),
(2) Date: Nov. 20, 2018

(87) PCT Pub. No.: WO2017/217710
PCT Pub. Date: Dec. 21, 2017

(65) Prior Publication Data
US 2019/0212625 A1 Jul. 11, 2019

(30) Foreign Application Priority Data

Jun. 13, 2016 (KR) .................. 10-2016-0072932

(51) Int. Cl.
*G02F 1/15* (2019.01)
*G02F 1/155* (2006.01)
*G02F 1/1523* (2019.01)

(52) U.S. Cl.
CPC ............ *G02F 1/155* (2013.01); *G02F 1/1525* (2013.01); *G02F 2001/1552* (2013.01)

(58) Field of Classification Search
CPC .......... G02F 1/155; G02F 1/157; G02F 1/161; G02F 1/163; G02F 1/1506; G02F 1/1525;
(Continued)

(56) References Cited

U.S. PATENT DOCUMENTS

| 4,801,195 A * | 1/1989 | Kawai ...................... G02F 1/15 |
| | | 252/600 |
| 2013/0320322 A1* | 12/2013 | Muto .................. H01L 51/5203 |
| | | 257/40 |

(Continued)

FOREIGN PATENT DOCUMENTS

| JP | 62-143032 A | 6/1987 |
| JP | 64-90422 A | 4/1989 |

(Continued)

OTHER PUBLICATIONS

Extended European Search Report dated Mar. 21, 2019 for Application No. 17813534.9.

(Continued)

*Primary Examiner* — Mustak Choudhury
(74) *Attorney, Agent, or Firm* — Birch, Stewart, Kolasch & Birch, LLP (57) ABSTRACT

The present application relates to an electrochromic device, and according to one aspect of the present invention, there is provided an electrochromic device comprising a first electrode layer, a first electrochromic layer provided on the first electrode layer, an electrolyte layer provided on the first electrochromic layer, a second electrochromic layer provided on the electrolyte layer and a second electrode layer provided on the second electrochromic layer, wherein the electrochromic device comprises a first auxiliary electrode layer and a second auxiliary electrode layer each provided on each opposite surface of the first electrochromic layer and the second electrochromic layer opposed to each other with the electrolyte layer interposed therebetween.

9 Claims, 7 Drawing Sheets

(58) Field of Classification Search
CPC ............... G02F 1/1533; G02F 1/13439; G02F 2001/164; G02F 2001/1552; G02F 2001/1635; G02B 26/023
See application file for complete search history.

(56) References Cited

U.S. PATENT DOCUMENTS

2014/0177026 A1\*  6/2014  Tsai .................. G02F 1/155
                                                   359/266
2015/0077361 A1   3/2015  Seo et al.

FOREIGN PATENT DOCUMENTS

| | | |
|---|---|---|
| JP | 1-142927 U | 9/1989 |
| JP | 1-259325 A | 10/1989 |
| KR | 10-2014-0062640 A | 5/2014 |
| KR | 10-2015-0002506 A | 1/2015 |
| KR | 10-2015-0031917 A | 3/2015 |
| KR | 10-1509550 B1 | 4/2015 |
| KR | 10-2015-0087012 A | 7/2015 |
| KR | 10-2015-0090460 A | 8/2015 |
| KR | 10-2015-0090462 A | 8/2015 |

OTHER PUBLICATIONS

International Search Report (PCT/ISA/210) issued in PCT/KR2017/006058, dated Sep. 8, 2017.

\* cited by examiner

| Pitch (μm) | Line Width (μm) | Aperture Ratio (%) | Transmittance (%) |
|---|---|---|---|
| 50 | 5 | 81.0 | 72.9 |
| | 10 | 64.0 | 57.6 |
| | 30 | 16.0 | 14.4 |
| 100 | 5 | 90.3 | 81.2 |
| | 10 | 81.0 | 72.9 |
| | 30 | 49.0 | 44.1 |
| 150 | 5 | 93.4 | 84.1 |
| | 10 | 87.1 | 78.4 |
| | 30 | 64.0 | 57.6 |
| 200 | 5 | 95.1 | 85.6 |
| | 10 | 90.3 | 81.2 |
| | 30 | 72.3 | 65.0 |
| 300 | 5 | 96.7 | 87.0 |
| | 10 | 93.4 | 84.1 |
| | 30 | 81.0 | 72.9 |
| 400 | 5 | 97.5 | 87.8 |
| | 10 | 95.1 | 85.6 |
| | 30 | 85.6 | 77.0 |
| 500 | 5 | 98.0 | 88.2 |
| | 10 | 96.0 | 86.4 |
| | 30 | 88.4 | 79.5 |
| 1000 | 5 | 99.0 | 89.1 |
| | 10 | 98.0 | 88.2 |
| | 30 | 94.1 | 84.7 |

[Figure 11]

| Pitch (μm) | Line Width (μm) | Single-sided Application | | Double-sided Application | |
|---|---|---|---|---|---|
| | | Decoloring | Coloring | Decoloring | Coloring |
| 50 | 5 | 59.0 | 13.1 | 43.0 | 9.6 |
| | 10 | 46.7 | 10.4 | 26.9 | 6.0 |
| | 30 | 11.7 | 2.6 | 1.7 | 0.4 |
| 100 | 5 | 65.8 | 14.6 | 53.4 | 11.9 |
| | 10 | 59.0 | 13.1 | 43.0 | 9.6 |
| | 30 | 35.7 | 7.9 | 15.8 | 3.5 |
| 150 | 5 | 68.1 | 15.1 | 57.3 | 12.7 |
| | 10 | 63.5 | 14.1 | 49.8 | 11.1 |
| | 30 | 46.7 | 10.4 | 26.9 | 6.0 |
| 200 | 5 | 69.3 | 15.4 | 59.3 | 13.2 |
| | 10 | 65.8 | 14.6 | 53.4 | 11.9 |
| | 30 | 52.7 | 11.7 | 34.3 | 7.6 |
| 300 | 5 | 70.5 | 15.7 | 61.3 | 13.6 |
| | 10 | 68.1 | 15.1 | 57.3 | 12.7 |
| | 30 | 59.0 | 13.1 | 43.0 | 9.6 |
| 400 | 5 | 71.1 | 15.8 | 62.4 | 13.9 |
| | 10 | 69.3 | 15.4 | 59.3 | 13.2 |
| | 30 | 62.4 | 13.9 | 48.0 | 10.7 |
| 500 | 5 | 71.5 | 15.9 | 63.0 | 14.0 |
| | 10 | 70.0 | 15.6 | 60.5 | 13.4 |
| | 30 | 64.4 | 14.3 | 51.2 | 11.4 |
| 1000 | 5 | 72.2 | 16.0 | 64.3 | 14.3 |
| | 10 | 71.5 | 15.9 | 63.0 | 14.0 |
| | 30 | 68.6 | 15.2 | 58.1 | 12.9 |

ELECTROCHROMIC DEVICE

TECHNICAL FIELD

The present invention relates to an electrochromic device.

The present application claims the benefit of priority based on Korean Patent Application No. 10-2016-0072932 filed on Jun. 13, 2016, the disclosure of which is incorporated herein by reference in its entirety.

BACKGROUND ART

The electrochromic device refers to an element that utilizes a reversible color change appearing when an electrochromic material causes an electrochemical oxidation or reduction reaction. Such an electrochromic device has a disadvantage that the response speed is slow, but the device having a wide area can be manufactured even at a small cost and first of all, it has an advantage that power consumption is low. Accordingly, the electrochromic device has attracted attention in various fields such as smart windows, smart mirrors, electronic papers or next generation architectural window materials.

Conventional electrochromic devices are formed by comprising a first electrode (for example, an ITO electrode), an electrochromic layer provided on the first electrode, an electrolyte layer provided on the electrochromic layer, an ion storage layer provided on the electrolyte layer, and a second electrode (for example, an ITO electrode) provided on the ion storage layer. The electrochromic layer and/or the ion storage layer may comprise an electrochromic material, where the color may change according to an applied voltage. In addition, a transparent base material formed of glass or a polymer resin may be further provided on one side of the first electrode and/or the second electrode.

In order to overcome the slow response speed of the conventional electrochromic device, it was necessary to introduce a transparent electrode having a low resistance. In particular, the conventional ITO electrode caused a difference in the discoloration response speed by a voltage drop occurring in a wide area electrochromic device due to a high resistance, and as a technique to overcome this, a transparent electrode having a low resistance, such as metal mesh or OMO, has been actively developed.

Furthermore, various types of auxiliary electrodes have been developed to improve the response speed of the electrochromic device.

DISCLOSURE

Technical Problem

It is a problem to be solved by the present invention to provide an electrochromic device capable of high-speed driving by improving the response speed.

Also, it is a problem to be solved by the present invention to provide an electrochromic device capable of preventing metal elution from an auxiliary electrode.

Furthermore, it is a problem to be solved by the present application to provide an electrochromic device capable of adjusting a transmittance range upon coloring and decoloring while improving a response speed through an auxiliary electrode.

Technical Solution

To solve the above-described problems, according to one aspect of the present invention, there is provided an electrochromic device comprising a first electrode layer, a first electrochromic layer provided on the first electrode layer, an electrolyte layer provided on the first electrochromic layer, a second electrochromic layer provided on the electrolyte layer and a second electrode layer provided on the second electrochromic layer, wherein the electrochromic device comprises a first auxiliary electrode layer and a second auxiliary electrode layer each provided on each opposite surface of the first electrochromic layer and the second electrochromic layer opposed to each other with the electrolyte layer interposed therebetween.

At this time, when the first and second auxiliary electrode layers are each projected onto the first electrode layer, the electrochromic device is provided such that a transmittance is controlled upon coloring and decoloring, based on the area of the first electrode layer covered with the first and second auxiliary electrode layers.

Also, when the first and second auxiliary electrode layers are each projected onto the first electrode layer, the electrochromic device may be provided such that the transmittance at a specific position of the electrochromic device is controlled upon coloring and decoloring, based on an aperture ratio of the first electrode layer, which is a ratio of the area of the first electrode layer that is not covered with the first and second auxiliary electrode layers after projection to the area of the first electrode layer before projection.

Furthermore, the electrochromic device may be provided such that as the aperture ratio increases, the transmittance increases and as the aperture ratio decreases, the transmittance decreases.

In addition, each of the auxiliary electrode layers may be formed of a metal mesh or metal strip pattern.

Also, each of the auxiliary electrode layers may comprise an electrode portion formed of a metal material and an insulation portion surrounding the electrode portion so as to insulate the electrode portion.

The insulation portion may be provided to prevent penetration of ions or electrons, and the insulation portion may be formed of a resin material.

Also, the insulation portion may be formed of an acrylate or epoxy resin.

Furthermore, the insulation portion may further comprise an inorganic filler or an inorganic filling agent.

In addition, the insulation portion may have a width of 5 mm or less and a thickness of 2 mm or less.

Also, the electrode portion may have a width of 3 mm or less and a thickness of 1 mm or less.

Furthermore, the first and second auxiliary electrode layers may be arranged symmetrically on the basis of the electrolyte layer.

In addition, the first and second auxiliary electrode layers may be arranged asymmetrically on the basis of the electrolyte layer.

Also, the aperture ratio may be determined according to line widths and pitches of the first and second auxiliary electrode layers.

Furthermore, according to another aspect of the present invention, there is provided an electrochromic device comprising a first electrode layer, a first electrochromic layer provided on the first electrode layer, an electrolyte layer provided on the first electrochromic layer, a second electrochromic layer provided on the electrolyte layer; and a second electrode layer provided on the second electrochromic layer, wherein it comprises a first auxiliary electrode layer and a second auxiliary electrode layer each provided on each opposite surface of the first electrode layer and the second electrode layer opposed to each other with the electrolyte layer interposed therebetween.

Here, when the first and second auxiliary electrode layers are each projected onto the first electrode layer, the electrochromic device is provided such that the transmittance is controlled upon coloring and decoloring, based on the area of the first electrode layer covered with the first and second auxiliary electrode layers.

Advantageous Effects

As described above, the electrochromic device according to one embodiment of the present invention has the following effects.

By facing a pair of auxiliary electrodes or arranging them to be staggered, the electrochromic device can have an improved response speed, thereby having the advantage that the high-speed driving is possible. Also, it is possible to prevent the metal from being eluted from the auxiliary electrode through insulation. Furthermore, the transmittance range can be controlled upon coloring and decoloring through the auxiliary electrodes.

MODE FOR INVENTION

Hereinafter, an electrochromic device according to one embodiment of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

Figure 1:
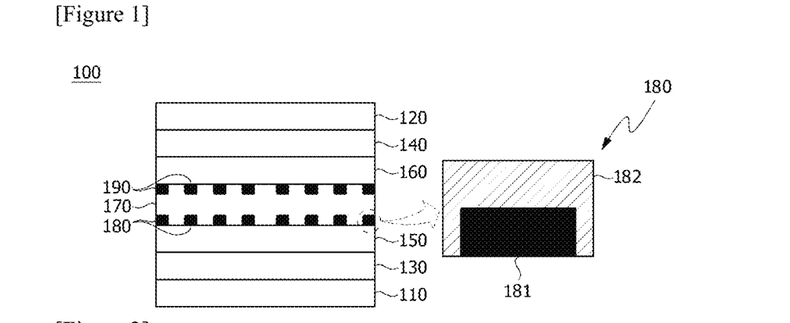
FIG. 1 is a conceptual diagram showing an electrochromic device related to a first embodiment of the present invention.
Figure 2:
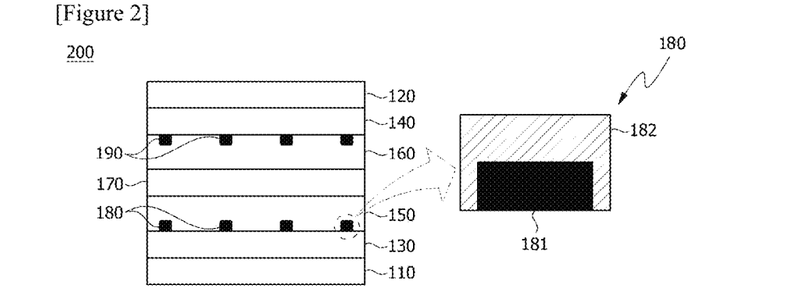
FIG. 2 is a conceptual diagram showing an electrochromic device related to a second embodiment of the present invention.

FIG. 1 is a conceptual diagram showing an electrochromic device (100) related to a first embodiment of the present invention, and FIG. 2 is a conceptual diagram showing an electrochromic device (200) related to a second embodiment of the present invention.

FIGS. 3 to 7 are conceptual diagrams showing a first auxiliary electrode layer (180).

Referring to FIG. 1, the electrochromic device (100) related to the first embodiment comprises a first electrode layer (130), a first electrochromic layer (150) provided on the first electrode layer (130), an electrolyte layer (170) provided on the first electrochromic layer (150), a second electrochromic layer (160) provided on the electrolyte layer (170), and a second electrode layer (140) provided on the second electrochromic layer (160).

In addition, a reference numeral 110 denotes a first substrate on which the first electrode layer (130) is provided and a reference numeral 120 denotes a second substrate on which the second electrode layer (140) is provided.

Furthermore, the electrochromic device (100) comprises a first auxiliary electrode layer (180) and a second auxiliary electrode layer (190) each provided on each opposite surface of the first electrochromic layer (150) and the second electrochromic layer (160) opposed to each other with the electrolyte layer (170) interposed therebetween.

Referring to FIG. 2, the electrochromic device (200) related to the second embodiment comprises a first electrode layer (130), a first electrochromic layer (150) provided on the first electrode layer (130), an electrolyte layer (170) provided on the first electrochromic layer (150), a second electrochromic layer (160) provided on the electrolyte layer (170) and a second electrode layer (140) provided on the second electrochromic layer (160).

In addition, the electrochromic device (200) comprises a first auxiliary electrode layer (180) and a second auxiliary electrode layer (190) each provided on each opposite surface of the first electrode layer (130) and the second electrode layer (140) opposed to each other with the electrolyte layer (170) interposed therebetween.

Referring to FIGS. 1 and 2, the electrochromic device (100) of the first embodiment and the electrochromic device (200) of the second embodiment differ only at the positions where the first auxiliary electrode layer (180) and the second auxiliary electrode layer (190) are formed and each of the auxiliary electrode layers (180, 190) has the same structure. That is, in FIGS. 1 and 2, the components indicated by the same reference numerals are the same.

The first substrate (110) and the second substrate (120) may be formed of glass or a polymer resin (for example, PET, PES, or the like).

The first and second electrode layers (130, 140) are a component for supplying electric charges to the electrochromic layers (150, 170), where each can be formed by comprising any one of a transparent conductive oxide selected from the group consisting of ITO (Indium Tin Oxide), FTO (Fluor doped Tin Oxide), AZO (Aluminium doped Zinc Oxide), GZO (Galium doped Zinc Oxide), ATO (Antimony doped Tin Oxide), IZO (Indium doped Zinc Oxide), NTO (Niobium doped Titanium Oxide), ZnO, OMO (Oxide/Metal/Oxide) and CTO; silver (Ag) nanowires; metal meshes; or OMO (oxide metal oxide). The first and second electrode layers (130, 140) are each a transparent electrode layer, which can be formed by comprising a material having a high transmittance to light, a low sheet resistance and a permeation resistance, and can be composed of an electrode plate shape.

The method of forming each of the electrode layers (150, 170) is not particularly limited, and any known method may be used without limitation. For example, a thin film electrode layer containing transparent conductive oxide particles can be formed on a glass base layer through a process such as sputtering or printing (screen printing, gravure printing, inkjet printing, etc.). The electrode layer thus prepared may have a thickness in a range of 10 nm to 500 nm in the case of the vacuum method, and may have a thickness in a range of 0.1 μm to 20 μm in the case of the printing method. In one example, the electrochromic device comprising the electrode layer may have a transmittance for visible light of 70% to 95%. In this document, the transmittance of the electrochromic device is the transmittance which includes the electrode layer and means the transmittance with regard to visible light.

In addition, the first electrochromic layer (150) may comprise a discoloring material having a chromogenic property complementary to that of the electrochromic material contained in the second electrochromic layer (160). The complementary chromogenic property refers to a case where the types of reactions in which the electrochromic material can be colored are different from each other, and for example, it means a case where the reductive discoloring material is used in the first electrochromic layer (150), when the oxidative discoloring material is used in the second electrochromic layer (160). As the discoloring material having the complementary chromogenic property is contained in the first electrochromic layer (150) and the second electrochromic layer (160), respectively, for example, the coloring of the first electrochromic layer (150) by the reduction reaction and the coloring of the second electrochromic layer (160) by the oxidation reaction can be performed at the same time, and in the contrary case, the decoloring of the first electrochromic layer (150) and the second electrochromic layer (160) can be performed at the same time. As a result, coloring and decoloring of the entire device can be performed at the same time. The coloring and decoloring as above may be alternated according to the polarity of the voltage applied to the device.

In one example, when an oxidative discoloring material is used for the second electrochromic layer (160), the first electrochromic layer (150) may comprise a reductive discoloring material such as tungsten oxide (WOx) as an electrochromic material. The method of forming the first and second electrochromic layers (150, 170) comprising the electrochromic material is not particularly limited and may be performed by, for example, vapor deposition.

The oxidative discoloring material may mean a material that is discolored when an oxidation reaction occurs, and the reductive discoloring material may mean a material that is discolored when a reduction reaction occurs. As the oxidative discoloring material, an oxide of Co, Rh, Ir, Ni, Cr, Mn and Fe, for example, $LiNiO_2$, $IrO_2$, NiO, $V_2O_5$, $LixCoO_2$, $Rh_2O_3$ or $CrO_3$ and the like is used, and as the reductive discoloring material, an oxide of Ti, V, Nb, Ta, Mo and W, for example, $WO_3$, $MoO_3$, $Nb_2O_5$, $Ta_2O_5$ or $TiO_2$ and the like is used, but the discoloring materials of the present application are not limited to the above oxides.

In the electrolyte layer (170), the type of the electrolyte, used in the electrolyte layer, as a material that provides a moving environment of hydrogen ions or lithium ions for discoloring or decoloring of the electrochromic material, is not particularly limited, and a liquid electrolyte, a gel polymer electrolyte or an inorganic solid electrolyte may be used.

The electrolyte may comprise one or more compounds, for example, of compounds comprising $H^+$, $Li^+$, $Na^+$, $K^+$, $Rb^+$, or $Cs^+$. In one example, the electrolyte layer may comprise a lithium salt compound such as $LiClO_4$, $LiBF_4$, $LiAsF_6$, or $LiPF_6$. The ions included in the electrolyte may play a part in discoloration or light transmittance change of the device while being inserted into or removed from the first electrochromic layer (150) or the first electrochromic layer (170) depending on the polarity of the applied voltage.

In one example, the electrolyte may further comprise a carbonate compound. Since the carbonate-based compound has a high dielectric constant, the ion conductivity provided by the lithium salt can be increased. As the carbonate-based compound, at least one of PC (propylene carbonate), EC (ethylene carbonate), DMC (dimethyl carbonate), DEC (diethyl carbonate) and EMC (ethylmethyl carbonate) may be used.

In one example, when an inorganic solid electrolyte is used in the electrolyte layer, the electrolyte may comprise LiPON or $Ta_2O_5$. Furthermore, the inorganic solid electrolyte may be an electrolyte in which components such as B, S, and W are added to LiPON or $Ta_2O_5$.

In addition, the electrochromic devices (100, 200) may further comprise a power source (driving part) for applying a voltage to the electrochromic layers (150, 170).

Figure 4:
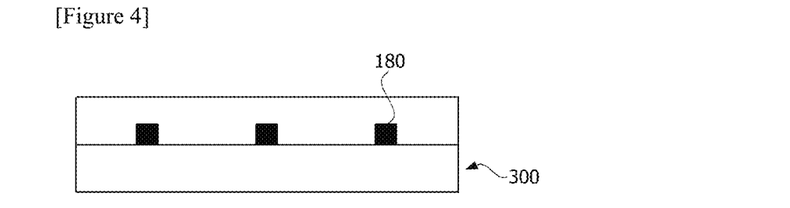
Figure 5:
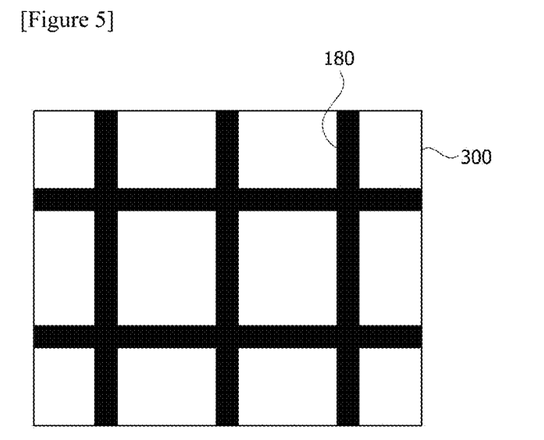
Figure 6:
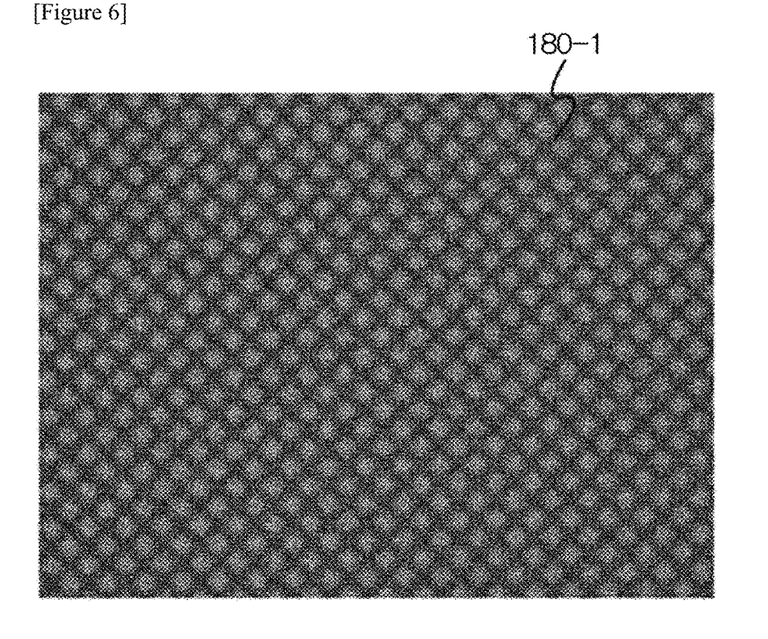
Figure 7:
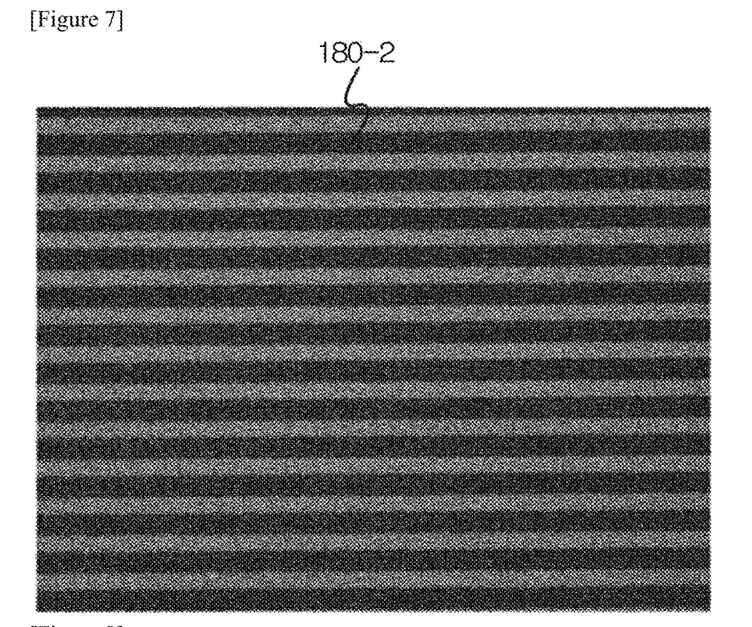

Furthermore, the first and second auxiliary electrode layers (180, 190) may be each formed of a metal material having a high electrical conductivity, and for example, may be formed of a material having high electrical conductivity such as silver (Ag) or copper (Cu). Also, the first auxiliary electrode layer (180) and the second auxiliary electrode layer (190) may each have a metal mesh or metal strip pattern. In addition, since the first and second auxiliary electrode layers (190, 180) have the same structure, the first auxiliary electrode layer will be described as an example. Referring to FIGS. 4 and 5, the metal mesh pattern (180-1) may include a first component extending in a first direction and a second component extending in a second direction to intersect the first component. At this time, it has a plurality of openings by the cross structure of pluralities of first and second components. In addition, the metal strip pattern (180-2) has a strip shape extending in one direction.

Also, the first auxiliary electrode layer (180) and the second auxiliary electrode layer (190) may each comprise an electrode portion of a metal material and an insulation portion for insulating the electrode portion to prevent elution of the electrode portion upon operation of the electrochromic devices (100, 200). Specifically, due to the penetration of ions or electrons, an elution problem of the electrode portion may occur. The insulation portion may have a layer structure surrounding the electrode portion. For example, in FIG. 1, the insulation portion may surround the electrode portion so as to insulate the electrode portion from the electrolyte layer (170). Furthermore, in FIG. 2, the insulation portion may surround the electrode portion so as to insulate the electrode portion from the first and second electrochromic layers (150, 170), respectively.

The insulation portion insulation portion may be composed by comprising a resin material as a material that can prevent penetration of ions or electrons.

Figure 3:
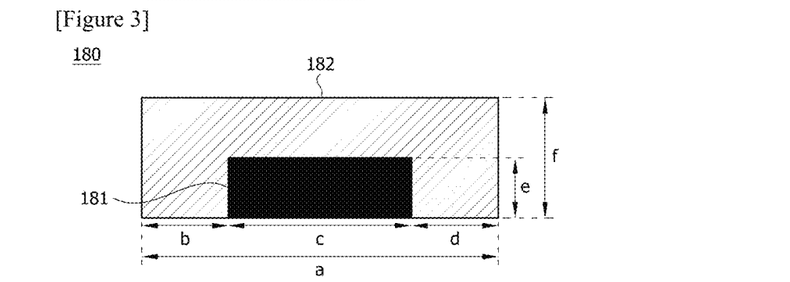
FIGS. 3 to 7 are conceptual diagrams showing a first auxiliary electrode layer.

FIG. 3 is a conceptual diagram showing the first auxiliary electrode layer (180), and referring to FIG. 3, for each of an electrode portion (181) and an insulation portion (182), in one example, a (width of the insulation portion) may be 5 mm or less, b, c (width of the electrode portion) and d may be each 3 mm or less, e (thickness of the electrode portion) may be 1 mm or less, and f (thickness of the insulation portion) may be 2 mm or less. Also, c/a may be 0.9 or less, and b/d may be 1.5 or less.

Figure 8:
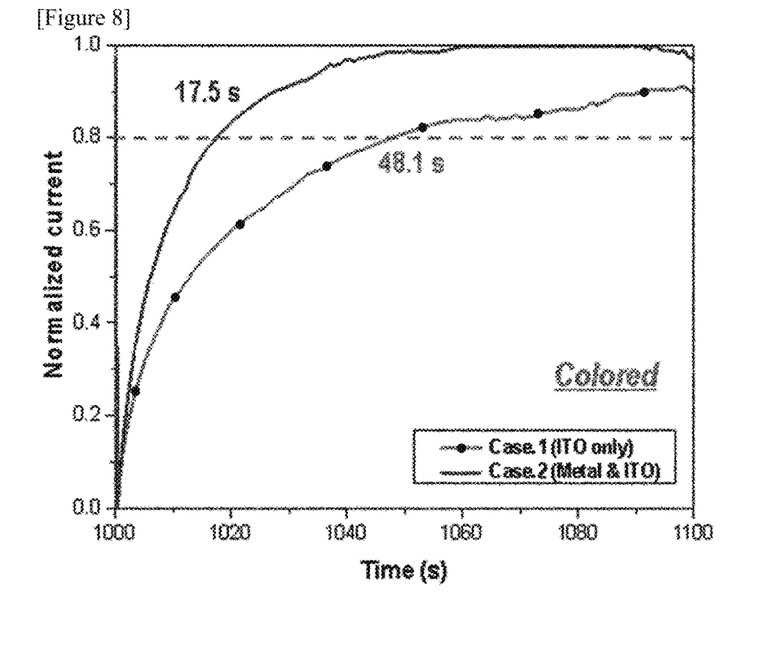
FIGS. 8 and 9 are graphs for explaining the response speed change of the electrochromic device by the auxiliary electrode layer.
Figure 9:
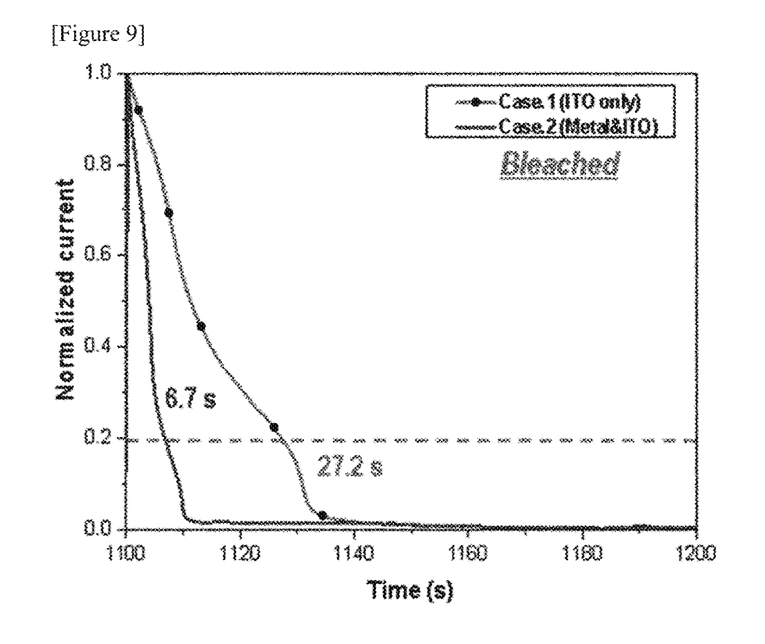

FIGS. 8 and 9 are graphs for explaining the response speed change of the electrochromic device by the auxiliary electrode layer. Specifically, FIGS. 8 and 9 are graphs for explaining the difference in the response speeds of the case of forming both the electrode layer and the auxiliary electrode layer having a pitch of 500 and a line width of 10 μm (Case 2) and the case of forming only the electrode layer (ITO) (Case 1) upon coloring (FIG. 8) and decoloring (FIG. 9). Referring to FIGS. 8 and 9, as compared with the case of using only the ITO electrode layer (Case 1) and the case of using the auxiliary electrode layer together (Case 2), it can be confirmed that the rate at 80% reaction time increases about 2.7 times upon coloring and about 4 times upon decoloring.

Figure 10:
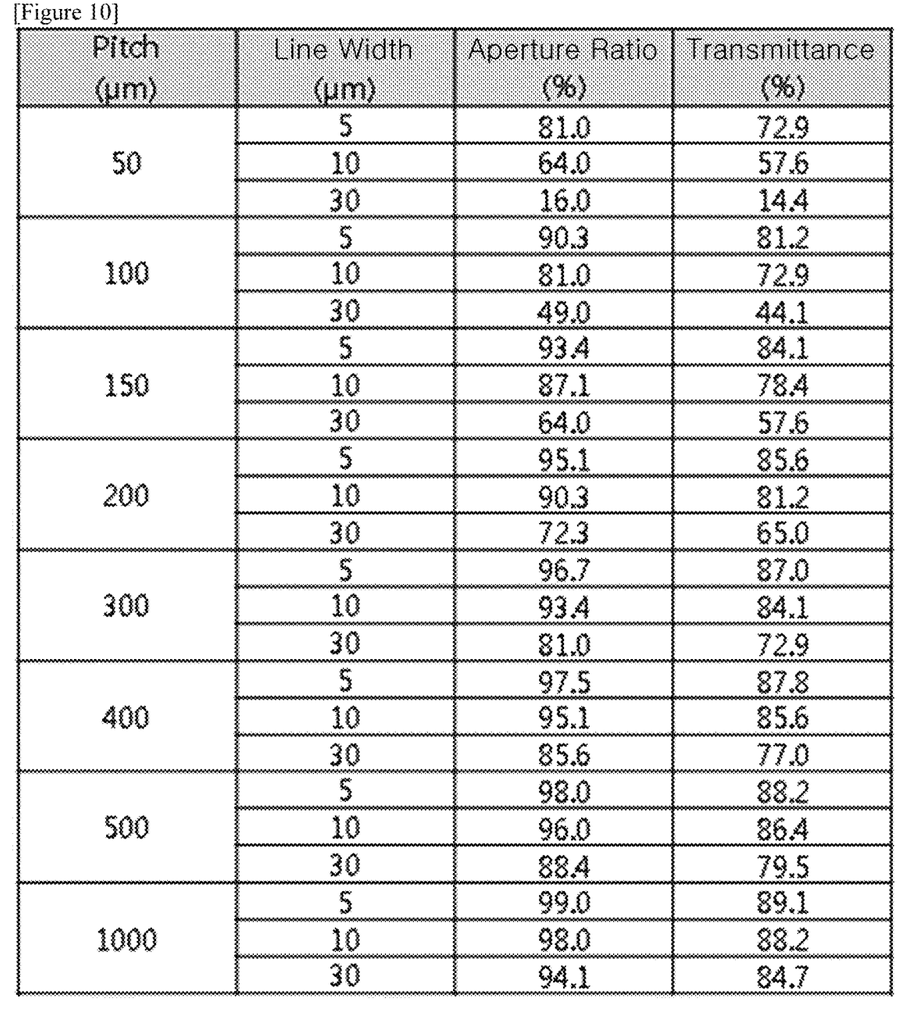
FIGS. 10 and 11 are tables for explaining the relationship between the aperture ratio and the transmittance.
Figure 11:
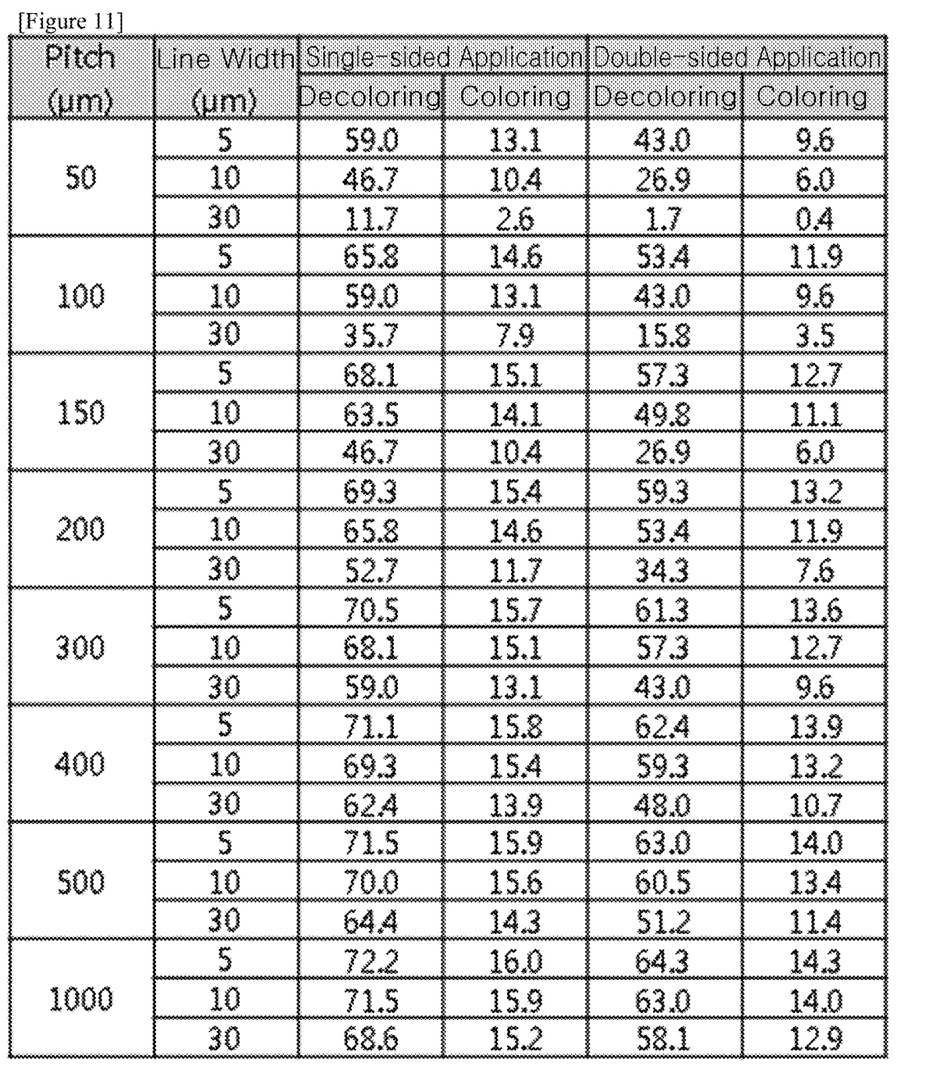

FIGS. 10 and 11 are tables for explaining the relationship between the aperture ratio and the transmittance.

When the first and second auxiliary electrode layers (180, 190) are each projected onto the first electrode layer (130) (or the second electrode layer), the electrochromic devices (100, 200) are provided such that the transmittance is controlled upon coloring and decoloring, based on the area of the first electrode layer (130) (or the second electrode layer) covered with the first and second auxiliary electrode layers (180, 190). Specifically, when the first and second auxiliary electrode layers (180, 190 are each projected onto the first electrode layer (130), it may be provided such that the transmittance at a specific position of the electrochromic device is controlled upon coloring and decoloring, based on the aperture ratio of the first electrode layer, which is a ratio of the area of the first electrode layer (130) that is not covered with the first and second auxiliary electrode layers (180, 190) after projection to the area of the first electrode layer (130) before projection.

FIG. 10 is a table for explaining the relationship between the aperture ratio and the transmittance according to the pitch and line width in the metal mesh type. Referring to FIG. 10, it can be confirmed that as the aperture ratio increases, the transmittance increases, and as the aperture ratio decreases, the transmittance decreases. That is, as the area covered with the first and second auxiliary electrode layers (180, 190) on the first electrode layer (130) (or the second electrode layer) after the projection increases, the transmittance is lowered, and on the contrary, the area covered with the first and second auxiliary electrode layers (180, 190) on the first electrode layer (130) (or the second electrode layer) decreases, the transmittance increases.

Referring to FIG. 11, the term single-sided application is a measurement result in the PET/ITO/WO3 structure, which is a half region of the entire layer structure in the electrochromic device, and the term double-sided application means a measurement result in the PET/ITO/WO3/GPE/PB/ITO/PET structure, which is the entire region of the entire layer structure in the electrochromic device. Referring to FIG. 11, it can be confirmed that the aperture ratio and transmittance are determined according to the line widths and pitches of the first and second auxiliary electrode layers (180, 190).

Figure 12:
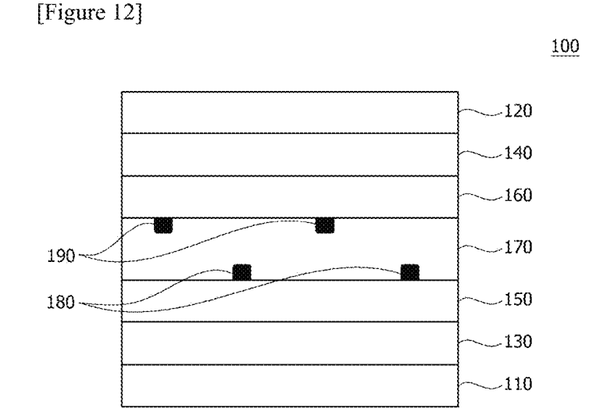
FIGS. 12 to 14 are conceptual diagrams for explaining arrangement of the first and second auxiliary electrode layers.
Figure 13:
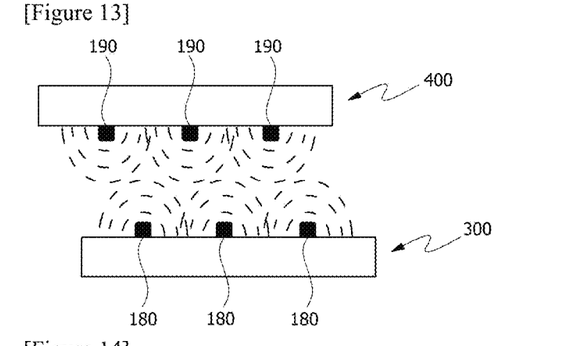
Figure 14:
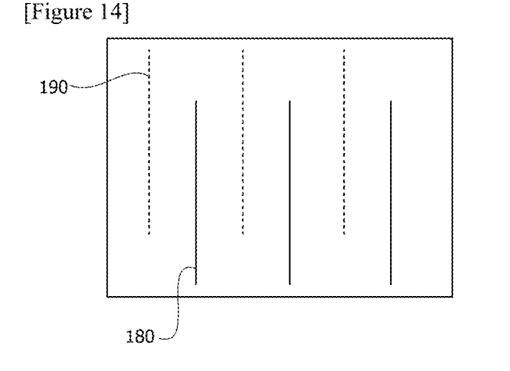

FIGS. 12 to 14 are conceptual diagrams for explaining arrangement of the first and second auxiliary electrode layers. In these figures, a reference numeral 300 denotes a first electrode layer or a first electrochromic layer on which a first auxiliary electrode layer can be formed, and a reference numeral 400 denotes a second electrode layer or a second electrochromic layer on which a second auxiliary electrode layer can be formed.

The first and second auxiliary electrode layers (180, 190) may be arranged symmetrically on the basis of the electrolyte layer. Unlike this, referring to FIGS. 12 to 14, the first and second auxiliary electrode layers (180, 190) may be arranged asymmetrically on the basis of the electrolyte layer. That is, the first and second auxiliary electrode layers (190, 180) may be arranged to be staggered on the basis of the electrolyte layer (170).

As in FIGS. 13 and 14, a difference in time required to reach a specific transmittance may occur depending on the density degree of the electric field.

Furthermore, in one example, the electrochromic devices (100, 200) may be provided to have an aperture ratio of about 50 to 95% and a transmittance of about 50 to about 95% in consideration of the formation area of the first and second auxiliary electrode layers (190, 180).

The preferred embodiments of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, it is possible to improve the response speed of the electrochromic device, and accordingly, there is an advantage that high-speed driving is possible.

Furthermore, the transmittance range can be controlled upon coloring and decoloring through the auxiliary electrode.

The invention claimed is:

1. An electrochromic device comprising:
a first electrode layer; a first electrochromic layer provided on the first electrode layer; an electrolyte layer provided on the first electrochromic layer; a second electrochromic layer provided on the electrolyte layer; and a second electrode layer provided on the second electrochromic layer,
wherein a first auxiliary electrode layer and a second auxiliary electrode layer are each provided on each opposite surface of the first electrochromic layer and the second electrochromic layer opposed to each other with the electrolyte layer interposed therebetween, and
wherein a transmittance at a specific position of the electrochromic device is controlled upon coloring and decoloring, based on an aperture ratio of the first electrode layer, when the first and second auxiliary electrode layers are each projected onto the first electrode layer;
wherein the aperture ratio is based on the area of the first electrode layer covered with the first and second auxiliary electrode layers,
wherein the aperture ratio is a ratio between (i) the area of the first electrode layer that is not covered with the first and second auxiliary electrode layers after projection and (ii) the area of the first electrode layer before projection;
wherein the first auxiliary electrode layer and the second auxiliary electrode layer each have a metal mesh pattern,
wherein the metal mesh pattern include a first component extending in a first direction and a second component extending in a second direction to intersect the first component,
wherein the first and second auxiliary electrode layers are arranged asymmetrically on the electrolyte layer, and
wherein the aperture ratio is determined according to line widths and pitches of the first and second auxiliary electrode layers.

2. The electrochromic device according to claim 1, wherein as said aperture ratio increases, the transmittance increases and as said aperture ratio decreases, the transmittance decreases.

3. The electrochromic device according to claim 1, wherein each of the auxiliary electrode layers comprises:
an electrode portion formed of a metal material; and an insulation portion surrounding said electrode portion so as to insulate said electrode portion.

4. The electrochromic device according to claim 3, wherein said insulation portion is formed of a resin material.

5. The electrochromic device according to claim 4, wherein said insulation portion is formed of an acrylate or epoxy resin.

6. The electrochromic device according to claim 4, wherein said insulation portion further comprises an inorganic filler or an inorganic filling agent.

7. The electrochromic device according to claim 3, wherein said insulation portion has a width of 5 mm or less and a thickness of 2 mm or less.

8. The electrochromic device according to claim 3, wherein said electrode portion has a width of 3 mm or less and a thickness of 1 mm or less.

9. An electrochromic device comprising:
a first electrode layer; a first electrochromic layer provided on the first electrode layer; an electrolyte layer provided on the first electrochromic layer; a second electrochromic layer provided on the electrolyte layer; and a second electrode layer provided on the second electrochromic layer,
wherein a first auxiliary electrode layer and a second auxiliary electrode layer are each provided on each opposite surface of the first electrode layer and the second electrode layer opposed to each other with the electrolyte layer interposed therebetween, and
wherein a transmittance is controlled upon coloring and decoloring, based on an aperture ratio of the first electrode layer, when the first and second auxiliary electrode layers are each projected onto the first electrode layer;
wherein the aperture ratio is based on the area of the first electrode layer covered with the first and second auxiliary electrode layers,
wherein the aperture ratio is a ratio between (i) the area of the first electrode layer that is not covered with the first and second auxiliary electrode layers after projection and (ii) the area of the first electrode layer before projection;
wherein the first auxiliary electrode layer and the second auxiliary electrode layer each have a metal mesh pattern,
wherein the metal mesh pattern include a first component extending in a first direction and a second component extending in a second direction to intersect the first component,
wherein the first and second auxiliary electrode layers are arranged asymmetrically on the electrolyte layer, and
wherein the aperture ratio is determined according to line widths and pitches of the first and second auxiliary electrode layers.

\* \* \* \* \*